(12) United States Patent
Chen et al.

(10) Patent No.: US 11,433,932 B2
(45) Date of Patent: Sep. 6, 2022

(54) POSITIONING SYSTEM AND METHOD FOR MONORAIL TRAIN

(71) Applicant: BYD COMPANY LIMITED, Shenzhen (CN)

(72) Inventors: Chujun Chen, Shenzhen (CN); Kaikuo Zhuo, Shenzhen (CN); Faping Wang, Shenzhen (CN)

(73) Assignee: BYD COMPANY LIMITED, Shenzhen (CN)

(*) Notice: Subject to any disclaimer, the term of this patent is extended or adjusted under 35 U.S.C. 154(b) by 273 days.

(21) Appl. No.: 16/473,780

(22) PCT Filed: Dec. 26, 2017

(86) PCT No.: PCT/CN2017/118717
§ 371 (c)(1),
(2) Date: Jun. 26, 2019

(87) PCT Pub. No.: WO2018/121543
PCT Pub. Date: Jul. 5, 2018

(65) Prior Publication Data
US 2019/0337544 A1    Nov. 7, 2019

(30) Foreign Application Priority Data
Dec. 27, 2016    (CN) .......................... 201611227375.7

(51) Int. Cl.
*G01S 1/68* (2006.01)
*B61L 25/02* (2006.01)
*G01S 5/02* (2010.01)

(52) U.S. Cl.
CPC .............. *B61L 25/028* (2013.01); *G01S 1/68* (2013.01); *G01S 5/02695* (2020.05)

(58) Field of Classification Search
CPC .... B61L 25/023; B61L 25/025; B61L 25/028; G01S 1/68; G01S 5/02695
See application file for complete search history.

(56) References Cited

U.S. PATENT DOCUMENTS 3,757,112 A * 9/1973 Lehmann ................ B61L 25/02
246/122 R
7,826,938 B2 * 11/2010 Kato ...................... B61L 25/025
701/19
(Continued)

FOREIGN PATENT DOCUMENTS

CN    102039916 A    5/2011
CN    102099237 A    6/2011
(Continued)

OTHER PUBLICATIONS

CN102139704 English Translation of Description (Year: 2011).*
(Continued)

*Primary Examiner* — Gregory C. Issing
(74) *Attorney, Agent, or Firm* — Anova Law Group, PLLC

(57) ABSTRACT

A positioning system and method for a monorail train are disclosed. The system includes: a first beacon, laid on one side of an up-going rail; a second beacon, laid on one side of a down-going rail, the first beacon and the second beacon being laid asymmetrically; a first beacon antenna and a second beacon antenna, the first beacon antenna being provided at a front carriage of the monorail train, the second beacon antenna being provided at a rear carriage of the monorail train, and the first beacon antenna and the second beacon antenna being provided on two opposite sides of the monorail train; and a positioning device, configured to acquire beacon data read by the first beacon antenna and beacon data read by the second beacon antenna and to determine a running direction and position information of (Continued)

the monorail train according to the beacon data read by the first beacon antenna and the beacon data read by the second beacon antenna.

10 Claims, 2 Drawing Sheets

(56) References Cited

U.S. PATENT DOCUMENTS

| | | | | |
|---|---|---|---|---|
| 8,712,612 | B2* | 4/2014 | Beaurent | B61L 25/023 |
| | | | | 701/19 |
| 9,734,712 | B1* | 8/2017 | Lai | B61L 25/025 |
| 9,940,833 | B2* | 4/2018 | Assenbaum | G08G 1/056 |
| 2008/0055043 | A1* | 3/2008 | Webb | G06Q 10/087 |
| | | | | 340/10.1 |
| 2014/0263862 | A1* | 9/2014 | Morris | B61L 3/125 |
| | | | | 246/2 R |
| 2016/0046306 | A1* | 2/2016 | Miyajima | B61L 27/40 |
| | | | | 701/19 |

FOREIGN PATENT DOCUMENTS

| | | | |
|---|---|---|---|
| CN | 102139704 A | 8/2011 | |
| CN | 202463845 U | 10/2012 | |
| CN | 102887158 A | 1/2013 | |
| CN | 103813398 A | 5/2014 | |
| CN | 204037593 U | 12/2014 | |
| CN | 204055834 U | 12/2014 | |
| CN | 105197069 A | 12/2015 | |
| JP | 2008056179 A | 3/2008 | |
| WO | WO-0246019 A1 * | 6/2002 | .......... B61L 27/0038 |
| WO | 2013008063 A1 | 1/2013 | |

OTHER PUBLICATIONS

CN103813398 English Translation of Description (Year: 2014).*
The World Intellectual Property Organization (WIPO) International Search Report for PCT/CN2017/118717 dated Mar. 23, 2018 6 Pages.

* cited by examiner

POSITIONING SYSTEM AND METHOD FOR MONORAIL TRAIN

CROSS-REFERENCE TO RELATED APPLICATIONS

This application is a national phase entry under 35 U.S.C. § 371 of International Application No. PCT/CN2017/118717, filed on Dec. 26, 2017, which claims priority to Chinese Patent Application No. 201611227375.7, filed on Dec. 27, 2016, content of all of which is incorporated herein by reference in its entirety.

FIELD

The present application relates to the technical field of rail transit and, in particular, to a positioning system for a monorail train and a positioning method thereof.

BACKGROUND

In a conventional rail transit beacon mounting scheme, a beacon is mounted in the middle of a rail. Two beacon antennas are mounted at the bottom of a train and separately provided for a front carriage and a rear carriage. When the train passes the position where the beacon is located, an electromagnetic wave signal transmitted by an on-board beacon antenna activates the beacon and transmits absolute position information and other information to the train.

In such a scheme, when the train is initially positioned or repositioned from a fault, the position and running direction of the train needs to be determined through two consecutive beacons. This method of train positioning is complicated, and the number of beacons laid on an entire line must be sufficient to ensure accurate positioning.

SUMMARY

An objective of the present application is to at least resolve one of the technical problems in the related art to some extent. In view of this, the present application is directed to a positioning system for a monorail train, which is not only simple in algorithm and high in positioning efficiency, but also can greatly reduce the number of ground beacons laid.

The present application is also directed to a positioning method for a monorail train.

To achieve the above objectives, a first aspect of the present application provides a positioning system for a monorail train. The system includes: a first beacon, laid on one side of an up-going rail; a second beacon, laid on one side of a down-going rail, the first beacon and the second beacon being laid asymmetrically; a first beacon antenna and a second beacon antenna, the first beacon antenna being provided at a front carriage of the monorail train, the second beacon antenna being provided at a rear carriage of the monorail train, and the first beacon antenna and the second beacon antenna being provided on two opposite sides of the monorail train; and a positioning device, configured to acquire beacon data read by the first beacon antenna and beacon data read by the second beacon antenna and to determine a running direction and position information of the monorail train according to the beacon data read by the first beacon antenna and the beacon data read by the second beacon antenna.

According to the positioning system for a monorail train provided by the embodiment of the present application, the first beacon and the second beacon are laid on one side of the up-going rail and one side of the down-going rail asymmetrically, the first beacon antenna and the second beacon antenna are provided at a front carriage and a rear carriage of the monorail train respectively, the first beacon antenna and the second beacon antenna are provided on two opposite sides of the monorail train, and the positioning device may determine the running direction and position information of the monorail train according to the beacon data read by the first beacon antenna and the beacon data read by the second beacon antenna. Therefore, when the monorail train is initially positioned or repositioned from a fault, the position information and running direction of the monorail train can be determined by a beacon, which is not only simple in algorithm and high in positioning efficiency, but also can greatly reduce the number of ground beacons laid.

To achieve the above objectives, a second aspect of the present application provides a positioning method for a monorail train. The method includes: laying a first beacon on one side of an up-going rail, and laying a second beacon on one side of a down-going rail, the first beacon and the second beacon being laid asymmetrically; providing the first beacon antenna at a front carriage of the monorail train, and providing the second beacon antenna at a rear carriage of the monorail train, the first beacon antenna and the second beacon antenna being provided on two opposite sides of the monorail train; and acquiring beacon data read by the first beacon antenna and beacon data read by the second beacon antenna, and determining the running direction and position information of the monorail train according to the beacon data read by the first beacon antenna and the beacon data read by the second beacon antenna.

According to the positioning method for a monorail train provided by the embodiment of the present application, the first beacon and the second beacon are laid on one side of the up-going rail and one side of the down-going rail asymmetrically, the first beacon antenna and the second beacon antenna are provided at a front carriage and a rear carriage of the monorail train respectively, the first beacon antenna and the second beacon antenna are provided on two opposite sides of the monorail train, and the running direction and position information of the monorail train may be determined according to the beacon data read by the first beacon antenna and the beacon data read by the second beacon antenna. Therefore, when the monorail train is initially positioned or repositioned from a fault, the position information and running direction of the monorail train can be determined by a beacon, which is not only simple in algorithm and high in positioning efficiency, but also can greatly reduce the number of ground beacons laid.

Additional aspects and advantages of embodiments of the present application will be given in part in the following descriptions, become apparent in part from the following descriptions, or be learned from the practice of the embodiments of the present application.

DETAILED DESCRIPTION

The following describes in detail embodiments of the present disclosure. Examples of the embodiments are shown in the accompanying drawings, where reference signs that are the same or similar may represent same or similar components or components that have same or similar functions. The following embodiments described with reference to the accompanying drawings are exemplary, and are intended to describe this application and cannot be construed as a limitation to this application.

The positioning system and method for a monorail train of the embodiments of the present disclosure will be described below with reference to the accompanying drawings.

Figure 1:
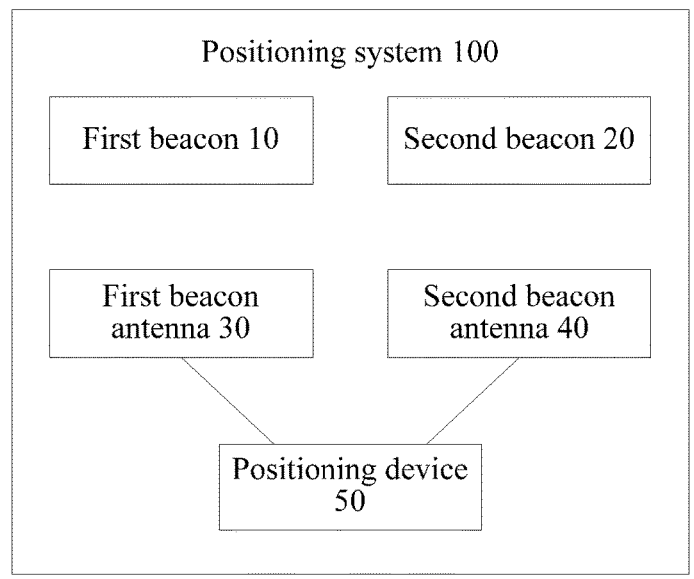
FIG. 1 is a schematic block diagram of a positioning system for a monorail train according to an embodiment of the present disclosure.

FIG. 1 is a schematic block diagram of a positioning system for a monorail train according to an embodiment of the present disclosure.

As shown in FIG. 1, a positioning system 100 for a monorail train of an embodiment of the present disclosure includes: a first beacon 10, a second beacon 20, a first beacon antenna 30, a second beacon antenna 40, and a positioning device 50.

The first beacon 10 is laid on one side of an up-going rail, and the second beacon 20 is laid on one side of a down-going rail. The first beacon 10 and the second beacon 20 are laid asymmetrically. In one embodiment of the present disclosure, the first beacon 10 and the second beacon 20 may be passive beacons or active beacons. Beacon data of the passive beacon stores fixed position information, information in beacon data of the active beacon may be changed, and in addition to the position information, there may be other information such as speed limit, line gradient and curvature.

The first beacon antenna 30 is provided at a front carriage of the monorail train, the second beacon antenna 40 is provided at a rear carriage of the monorail train, and the first beacon antenna 30 and the second beacon antenna 40 are provided on two opposite sides of the monorail train. When the first beacon antenna 30 and the second beacon antenna 40 are close to the first beacon 10 or the second beacon 20 on the same side thereof, beacon data may be read from the first beacon 10 or the second beacon 20.

The positioning device 50 is configured to acquire beacon data read by the first beacon antenna 30 and beacon data read by the second beacon antenna 40 and to determine a running direction and position information of the monorail train according to the beacon data read by the first beacon antenna 30 and the beacon data read by the second beacon antenna 40.

According to the first article of 3.3 Operating Model in the "National Standards of the People's Republic of China-Metro Design Code", there are provisions for a subway main line: a two-line and right-hand drive system should be adopted. A north-south route runs from south to north in an up-going direction, and runs from north to south in a down-going direction. An east-west route runs from west to east in an up-going direction, and runs from east to west in a down-going direction. A loop line should use an operation direction of the train on an outer rail line as an up-going direction, and use an operation direction of an inner rail line as a down-going direction. It will be appreciated that the regulations of the up-going rail and the down-going rail are different depending on different countries or regions, and the up-going rail and the down-going rail are merely exemplified here, and are not limited to the above.

Figure 2:
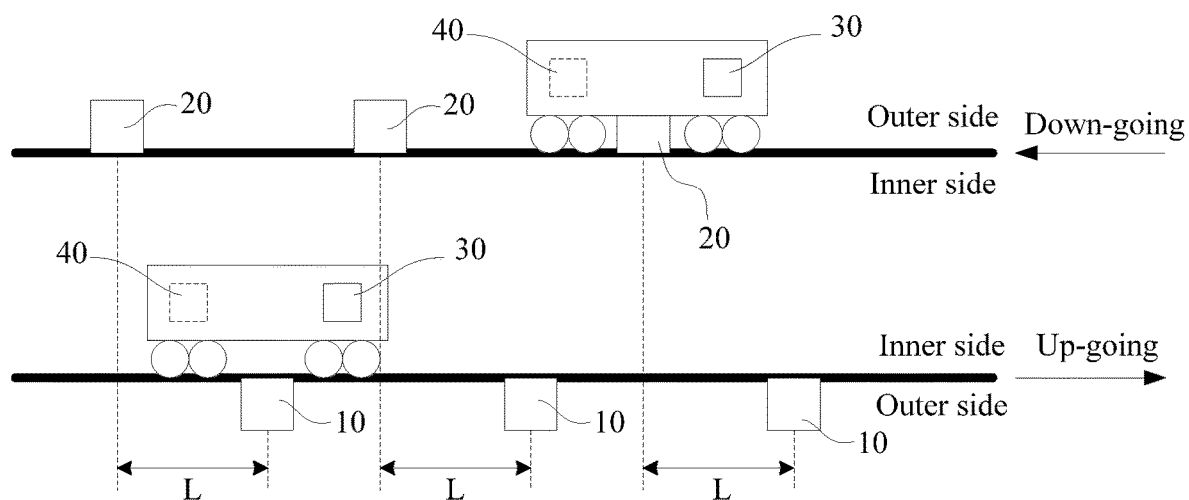
FIG. 2 is a schematic structure diagram of a positioning system for a monorail train according to an embodiment of the present disclosure.

In a specific embodiment of the present disclosure, as shown in FIG. 2, the first beacon 10 and the second beacon 20 may be laid on an outer side of the up-going rail and an outer side of the down-going rail, respectively. For example, as shown in FIG. 2, according to the above examples of the up-going rail and the down-going rail, the outer side of the up-going rail is a right side of the up-going rail along the direction of travel of the train. In a plurality of first beacons 10 and a plurality of second beacons 20, the corresponding first beacon 10 and second beacon 20 are spaced apart by a predetermined distance L along the running direction of the train, where L is greater than zero, that is, the corresponding first beacon 10 and second beacon 20 are asymmetrical. In a specific embodiment of the present disclosure, a distance L between the first beacon 10 and the second beacon 20 along the running direction of the train is the entire train length of the monorail train.

As shown in FIG. 2, the first beacon antenna 30 and the first beacon 10 are provided on the same side of the up-going rail, and the second beacon antenna 40 and the second beacon 20 are provided on the same side of the down-going rail. Therefore, the positioning device 50 may determine that the running direction of the monorail train and the front carriage are directed consistently when the first beacon antenna 30 reads the beacon data, and may determine that the running direction of the monorail train and the rear carriage are directed consistently when the second beacon antenna 40 reads the beacon data. Moreover, when the first beacon antenna 30 or the second beacon antenna 40 reads the beacon data, the position information of the monorail train may be acquired from the beacon data.

It will be appreciated that the above specific embodiment only shows a providing mode for a beacon and a beacon antenna, and a mode of determining the running direction and position information of a monorail train corresponding to the providing mode. In other embodiments of the present disclosure, the first beacon antenna and the second beacon antenna may also be provided on two opposite sides of the monorail train in other modes, and each providing mode corresponds to different modes of determining the running direction and position information of a monorail train respectively, and is not enumerated here.

According to the positioning system for a monorail train provided by the embodiment of the present disclosure, the first beacon and the second beacon are laid on one side of the up-going rail and one side of the down-going rail asymmetrically, the first beacon antenna and the second beacon antenna are provided at a front carriage and a rear carriage of the monorail train respectively, the first beacon antenna and the second beacon antenna are provided on two opposite sides of the monorail train, and the positioning device may determine the running direction and position information of the monorail train according to the beacon data read by the first beacon antenna and the beacon data read by the second beacon antenna. Therefore, when the monorail train is initially positioned or repositioned from a fault, the position information and running direction of the monorail train can be determined by a beacon, which is not only simple in algorithm and high in positioning efficiency, but also can greatly reduce the number of ground beacons laid.

Corresponding to the above embodiment, the present disclosure also provides a positioning method for a monorail train.

Figure 3:
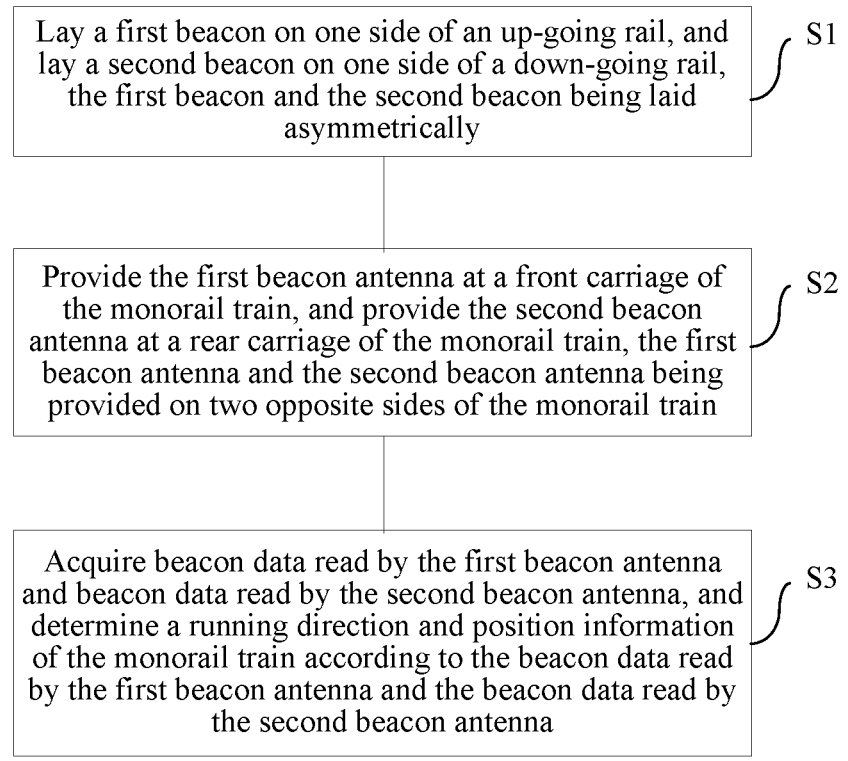
FIG. 3 is a flowchart of a positioning method for a monorail train according to an embodiment of the present disclosure.

As shown in FIG. 3, a positioning method for a monorail train according to an embodiment of the present disclosure includes the following steps:

S1: Lay a first beacon on one side of an up-going rail, and lay a second beacon on one side of a down-going rail, the first beacon and the second beacon being laid asymmetrically.

In one embodiment of the present disclosure, the first beacon and the second beacon may be passive beacons or active beacons. Beacon data of the passive beacon stores fixed position information, information in beacon data of the active beacon may be changed, and in addition to the position information, there may be other information such as speed limit, line gradient and curvature.

S2: Provide the first beacon antenna at a front carriage of the monorail train, and provide the second beacon antenna at a rear carriage of the monorail train, the first beacon antenna and the second beacon antenna being provided on two opposite sides of the monorail train.

When the first beacon antenna and the second beacon antenna are close to the first beacon or the second beacon on the same side thereof, beacon data may be read from the first beacon or the second beacon.

S3: Acquire beacon data read by the first beacon antenna and beacon data read by the second beacon antenna, and determine the running direction and position information of the monorail train according to the beacon data read by the first beacon antenna and the beacon data read by the second beacon antenna.

In a specific embodiment of the present disclosure, as shown in FIG. 2, the first beacon and the second beacon may be laid on an outer side of the up-going rail and an outer side of the down-going rail in one-to-one correspondence, respectively. That is, the first beacon is laid on an outer side of an up-going rail, and the second beacon is laid on an outer side of a down-going rail. In a plurality of first beacons and a plurality of second beacons, the corresponding first beacon and second beacon are spaced apart by a predetermined distance L along the running direction of the train, where L is greater than zero, that is, the corresponding first beacon and second beacon are asymmetrical. In a specific embodiment of the present disclosure, a distance L between the first beacon and the second beacon along the running direction of the train is the entire train length of the monorail train.

As shown in FIG. 2, the first beacon antenna and the first beacon are provided on the same side of the up-going rail, and the second beacon antenna and the second beacon are provided on the same side of the down-going rail. Therefore, when the first beacon antenna reads the beacon data, the running direction and position information of the monorail train may be determined according to the beacon data, for example, it may be determined that the running direction of the monorail train and the front carriage are directed consistently; and when the second beacon antenna reads the beacon data, the running direction and position information of the monorail train may be determined according to the beacon data, for example, it may be determined that the running direction of the monorail train and the rear carriage are directed consistently. Moreover, when the first beacon antenna or the second beacon antenna reads the beacon data, the position information of the monorail train may be acquired from the beacon data.

It will be appreciated that the above specific embodiment only shows a providing mode for a beacon and a beacon antenna, and a mode of determining the running direction and position information of a monorail train corresponding to the providing mode. In other embodiments of the present disclosure, the first beacon antenna and the second beacon antenna may also be provided on two opposite sides of the monorail train in other modes, and each providing mode corresponds to different modes of determining the running direction and position information of a monorail train respectively, and is not enumerated here.

According to the positioning method for a monorail train provided by the embodiment of the present disclosure, the first beacon and the second beacon are laid an one side of the up-going rail and one side of the down-going rail asymmetrically, the first beacon antenna and the second beacon antenna are provided at a front carriage and a rear carriage of the monorail train respectively, the first beacon antenna and the second beacon antenna are provided on two opposite sides of the monorail train, and the running direction and position information of the monorail train ay be determined according to the beacon data read by the first beacon antenna and the beacon data read by the second beacon antenna. Therefore, when the monorail train is initially positioned or repositioned from a fault, the position information and running direction the monorail train can be determined by one beacon, which is not only simple in algorithm and high in positioning efficiency, but also can greatly reduce the number of ground beacons laid.

In the description of the present disclosure, it should be understood that, orientations or position relationships indicated by terms such as "center", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present disclosure and simplifying the description, rather than indicating or implying that the apparatus or element should have a particular orientation or be constructed and operated in a particular orientation, and therefore, should not be construed as a limitation on the present disclosure.

In addition, terms "first" and "second" are used only for description purposes, and shall not be understood as indicating or suggesting relative importance or implicitly indicating a quantity of indicated technical features. Therefore, features modified by "first" and "second" may explicitly or implicitly include one or more features. In descriptions of the present disclosure, "multiple" means two or more, unless otherwise defined clearly and specifically.

In the present disclosure, unless otherwise clearly specified and limited, terms "mount", "connect", and "fix" should be understood in a generalized manner, for example, may be understood as fixed connection, detachable connection, or integration; or may be understood as mechanical connection or electrical connection; or may be understood as direct connection, or indirect connection by means of a medium, or internal communication of two elements or a mutual relationship between two elements. A person of ordinary skill in the art may understand specific meanings of the terms in the present disclosure according to specific situations.

In the present disclosure, unless explicitly specified or limited otherwise, a first characteristic "on" or "under" a second characteristic may be the first characteristic in direct contact with the second characteristic, or the first characteristic in indirect contact with the second characteristic by using an intermediate medium. Moreover, that the first feature is "above", "over", and "on" the second feature may be that the first feature is right above the second feature or at an inclined top of the second feature, or may merely indicate that the horizontal height of the first feature is higher than that of the second feature. That the first feature is "below", "under", and "beneath" the second feature may be that the first feature is right below the second feature or at an inclined bottom of the second feature, or may merely indicate that the horizontal height of the first feature is lower than that of the second feature.

In the description of the specification, the description made with reference to terms such as "one embodiment", "some embodiments", "example", "specific example", or "some examples" means that a specific characteristic, structure, material or feature described with reference to the embodiment or example is included in at least one embodiment or example of the present disclosure. In this specification, exemplary descriptions of the foregoing terms do not necessarily refer to a same embodiment or example. In addition, the described specific features, structures, materials, or characteristics may be combined in a proper manner in any one or more of the embodiments or examples. In addition, a person skilled in the art may integrate or combine different embodiments or examples and characteristics of different embodiments or examples described in the specification, as long as they do not conflict each other.

Although the embodiments of the present disclosure are shown and described above, it may be understood that the foregoing embodiments are examples, and cannot be understood as limitations to the present disclosure. A person of ordinary skill in the art may make changes, modifications, replacements, and variations to the foregoing embodiments without departing from the scope of the present disclosure.

What is claimed is:

1. A positioning system for a monorail train, comprising:
   a first beacon, laid on an outer side with respect to a first rail configured for the monorail train to run in a first direction;
   a second beacon, laid on an outer side with respect to a second rail configured for the monorail train to run in a second direction opposite to the first direction, the second rail being parallel to the first rail, and the second rail being adjacent to the first rail;
   a first beacon antenna and a second beacon antenna, the first beacon antenna being provided at a head compartment of a plurality of compartments of the monorail train, the second beacon antenna being provided at a tail compartment of the plurality of compartments of the monorail train, and the first beacon antenna and the second beacon antenna being provided on two opposite sides of the monorail train; and
   a positioning device, configured to acquire beacon data read by the first beacon antenna and beacon data read by the second beacon antenna and to determine a running direction and position information of the monorail train according to the beacon data read by the first beacon antenna and the beacon data read by the second beacon antenna, wherein:
   the first beacon and the second beacon being spaced apart by a predetermined distance along the running direction;
   in the first direction, both the first beacon antenna and the first beacon are located on an outer side with respect to the first rail; and in the second direction, both the second beacon antenna and the second beacon are located on an outer side with respect to the second rail.

2. The positioning system for the monorail train according to claim 1, wherein the predetermined distance between the first beacon and the second beacon along the running direction is an entire train length of the monorail train.

3. The positioning system for the monorail train according to claim 1, wherein the positioning device determines that the running direction of the monorail train is consistent with the direction that the head compartment faces forward when the first beacon antenna reads the beacon data, and determines that the running direction of the monorail train is consistent with the direction that the tail compartment faces backward when the second beacon antenna reads the beacon data.

4. The positioning system for the monorail train according to claim 1, wherein the first beacon and the second beacon are passive beacons, and information stored in the first beacon and the second beacon is fixed.

5. The positioning system for the monorail train according to claim 1, wherein the first beacon and the second beacon are active beacons, and information stored in the first beacon and the second beacon is changeable.

6. A positioning method for a monorail train, comprising:
   laying a first beacon on an outer side of a first rail configured for the monorail train to run in a first direction, and laying a second beacon on an outer side of a second rail configured for the monorail train to run in a second direction opposite to the first direction, the second rail being parallel to the first rail, and the second rail being adjacent to the first rail;
   providing the first beacon antenna at a head compartment of a plurality of compartments of the monorail train, and providing the second beacon antenna at a tail compartment of the plurality of compartments of the monorail train, the first beacon antenna and the second beacon antenna being provided on two opposite sides of the monorail train; and
   acquiring beacon data read by the first beacon antenna and beacon data read by the second beacon antenna, and determining a running direction and position information of the monorail train according to the beacon data read by the first beacon antenna and the beacon data read by the second beacon antenna, wherein:
   the first beacon and the second beacon are spaced apart by a predetermined distance along the running direction;
   in the first direction, both the first beacon antenna and the first beacon are located at an outer side with respect to the first rail; and in the second direction, both the second beacon antenna and the second beacon are located at an outer side with respect to the second rail.

7. The positioning method for the monorail train according to claim 6, wherein the predetermined distance between the first beacon and the second beacon along the running direction is an entire train length of the monorail train.

8. The positioning method for the monorail train according to claim 6, wherein it is determined that the running direction of the monorail train is consistent with the direction that the head compartment faces forward when the first beacon antenna reads the beacon data, and it is determined that the running direction of the monorail train is consistent with the direction that the tail compartment faces backward when the second beacon antenna reads the beacon data.

9. The positioning method for the monorail train according to claim 6, wherein the first beacon and the second beacon are passive beacons, and information stored in the first beacon and the second beacon is fixed.

10. The positioning method for the monorail train according to claim 6, wherein the first beacon and the second beacon are active beacons, and information stored in the first beacon and the second beacon is changeable.

* * * * *